April 3, 1934.　　　　V. OLDBERG　　　　1,953,124
COUPLING
Original Filed April 10, 1933
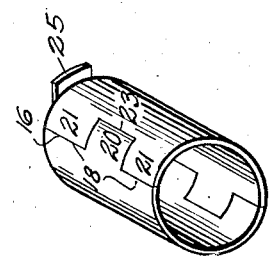
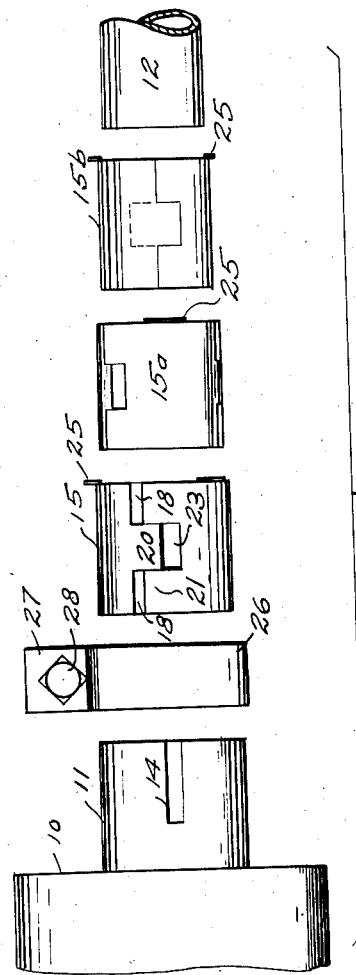
Inventor
Virgil Oldberg
by
Daniel G. Cullen
atty.

Patented Apr. 3, 1934

1,953,124

UNITED STATES PATENT OFFICE 1,953,124

COUPLING

Virgil Oldberg, Detroit, Mich., assignor to Oldberg Manufacturing Company, Detroit, Mich., a corporation of Michigan Original application April 10, 1933, Serial No. 665,366, now Patent No. 1,938,974, dated December 12, 1933. Divided and this application November 13, 1933, Serial No. 697,769

2 Claims. (Cl. 285—183)

This invention relates to pipe couplings.

In our prior application Serial No. 665,366, filed April 10, 1933, now Patent No. 1,938,974 of December 12, 1933 of which this application is a division, there are disclosed two different forms of couplings between a muffler connection and a pipe in the exhaust line, each of which couplings includes one or more split bushings. The claims of the foregoing application are not drawn to cover the coupling which includes the split bushings of Figs. 1-3 of that application specifically, and it is intended to cover in the present application couplings employing bushings like those of Figs. 1 to 3 of that application.

The principal object of the present invention is to provide means forming a sealing connection between the nested ends of pipes of dissimilar diameter, one of which may be a muffler connection, and the other of which may be a pipe in the exhaust line, the means taking up the circumferential space between the nested ends and comprising one or more split bushings.

Other objects of the invention will be observed upon reference to the following detailed description of an embodiment, shown in the appended drawing. In this drawing—

Fig. 1 shows a muffler connection and a pipe, and a plurality of bushings arranged to form a sealing connection between them, the parts being shown in elevation and about to be telescoped;

Fig. 2 shows a single bushing.

Referring to the drawing, it will be seen that there is disclosed a muffler 10 whose connection 11 is to receive therewithin a pipe 12. The connection may be on the inlet or the outlet end of the muffler, and the pipe 12 may be the exhaust pipe or the tail pipe.

The connection 11 is split as indicated at 14, so as to be contractible.

Disposed between the connection 11 and the pipe 12 is a nest of sheet metal bushings including, in the form shown, three relatively telescoped bushings 15, 15a, and 15b. These actually are identical in dimension and construction but are separately referenced for purposes of convenience.

Each of the bushings is generally cylindrical in form, and includes two or more sections, separated by longitudinal splits 16. One longitudinal edge of the flat blank from which a bushing section is made is formed to provide two notches 18 separated by a tongue 20. The other longitudinal edge of the blank from which the same section of the bushing is made is formed to provide two tongues 21, separated by a notch 23.

The tongues and the notches are longitudinally and circumferentially dimensioned so that each notch will receive a tongue, with a relatively close fit, especially along the circumferential edges of the tongues and notches.

It is also observed that the notches and tongues are of the same circumferential length, so that when a bushing is contracted to form a complete cylinder of the smallest diameter (Fig. 2) the split lines 16 thereof will be completely closed.

Further, each section of the bushing is formed with a lug 25.

The bushings are utilized as follows: Before the end of the pipe 12 is inserted into the connection 11, a split clamping collar 26 of conventional construction and having wings 27 adapted to be connected by a contracting bolt 28 is thrust over the connection 11.

Then one or more bushings, as the mechanic who is doing the assembly thinks will be necessary, is thrust into the connection 11, the sections of each bushing being arranged substantially as shown in Fig. 2 so as to form a complete bushing; when a plurality of bushings is used, they may be nested before insertion into the connection 11, or they may be inserted individually, telescoping one within the other.

The lugs 25 engage one another or circumferential edges of the cylindrical parts of the bushings between lugs, so as to limit axial movement of the bushings. The gaps between the edges of the splits in the outer bushings of the nests will be greater than the gaps between the edges of the splits in the inner bushings of the nest, since the bushings are identically dimensioned, and it might possibly be that the inner bushing of the nest will have no gap whatever at the split, the gap being completely closed as above described.

The mechanic then inserts the pipe end 12 into the nest of bushings and the assembly is then in a partially completed state, the parts being somewhat loose with respect to one another.

The clamping bolt 28 is then tightened and the parts are contracted to fit as closely as necessary to effect a tight connection.

It will be observed that the lugs 25, facilitate de-nesting of nested bushings, and also facilitate removal of bushings from the connection 11 or from the end of pipe 12.

It will also be observed that the bushing sections, when contracted, are flexed much less than is the case where the bushings are each made of one piece; and can be made much more cheaply than one piece bushings of similar form.

Now having described an embodiment of the invention, reference will be had to the following claims for a determination of the scope of the invention.

I claim:

1. Means forming a sealing connection between nested ends of pipes of dissimilar diameter and taking up all of the circumferential space between the nested ends comprising a nest of adapter or take-up bushings of thin and resilient sheet metal disposed in and taking up all of the circumferential space between the nested ends, each of said bushings comprising a plurality of complementary arcuate sections each of whose longitudinal edges is formed to cooperate with a complementary edge of an adjacent section and provide three or more interfitting tongue and notch interlocks.

2. Means forming a sealing connection between nested ends of pipes of dissimilar diameter and taking up all of the circumferential space between the nested ends comprising a nest of adapter or take-up bushings of thin and resilient sheet metal disposed in and taking up all of the circumferential space between the nested ends, each of said bushings comprising a plurality of complementary identical arcuate sections each of whose longitudinal edges is formed to cooperate with a complementary edge of an adjacent section and provide three or more interfitting tongue and notch interlocks, each section having one longitudinal edge provided with two notches and one tongue, and the other provided with two tongues and one notch.

VIRGIL OLDBERG.